United States Patent [19]

Nelson

[11] Patent Number: 4,731,719
[45] Date of Patent: Mar. 15, 1988

[54] CURRENT BOOSTED SWITCHING REGULATOR

[75] Inventor: Carl T. Nelson, San Jose, Calif.

[73] Assignee: Linear Technology Corporation, Milpitas, Calif.

[21] Appl. No.: 932,715

[22] Filed: Nov. 19, 1986

[51] Int. Cl.[4] .......................................... H02M 3/335
[52] U.S. Cl. ....................................... 363/20; 363/21
[58] Field of Search ...................... 363/20, 21, 97, 131

[56] References Cited

FOREIGN PATENT DOCUMENTS 1591630 10/1970 Fed. Rep. of Germany ........ 363/21

OTHER PUBLICATIONS

Russ Curtis, "An Inexpensive Switch Mode Power Supply", Motorola Inc., 1973, Figure 1.

Primary Examiner—Patrick R. Salce
Assistant Examiner—Kristine Peckman
Attorney, Agent, or Firm—Laurence S. Rogers

[57] ABSTRACT

A switching voltage regulator circuit is provided which regulates an input voltage to an output voltage of lesser magnitude, and which supplies an output current greater than the current through the switch employed in the circuit. The circuit includes a transformer which causes output current to be provided both when the switch is open and when it is closed.

5 Claims, 5 Drawing Figures

CURRENT BOOSTED SWITCHING REGULATOR

Background of the Invention

The present invention relates to a switching voltage regulator circuit capable of providing an output current which exceeds the maximum current rating of the switch employed in the circuit, and which exceeds the output current capabilities of conventional buck and flyback switching regulators.

A switching voltage regulator circuit can provide output voltages which are less than, greater than, or of opposite polarity to the input voltage, as determined by the configuration or topology of the circuit. In this manner, an unregulated input voltage can be stepped up, stepped down, or inverted to generate any arbitrary set of regulated dc voltages within a system. One conventional configuration for a switching voltage regulator employing a single switching device, and providing a stepped-down voltage, is known as a buck regulator.

A buck regulator operates to provide an output voltage ($V_{OUT}$) which is a product of the input voltage ($V_{IN}$) and the duty cycle (DC) of the switch, which by convention is defined as $DC=T1/(T1+T2)$, where T1 is the time that the switch is closed and T2 is the time that the switch is open. Because the duty cycle DC of the switch must have a value between zero and one, the output voltage $V_{OUT}$ is always less than the input voltage $V_{IN}$. Current is drawn from the input supply and provided to the load while the switch is closed. The closing of the regulator's switch applies the input voltage to an inductive/capacitive network which draws an input current through the switch. The maximum current rating of the switch, which is set by the manufacturer of the switch, places a limit on the peak current which can pass through the switch. In a conventional buck regulator, the output current provided to the load is equal to the switch current, and therefore cannot exceed the maximum current rating of the switch. Since the maximum output power provided by an ideal voltage regulator (which assumes no power loss in the regulator) is equal to the output voltage multiplied by the output current, which in the case of a buck regulator is equal to the switch current, the maximum output power which can be provided by a conventional buck regulator is equal to the output voltage multiplied by the maximum current rating of the switch.

Another common configuration for a switching voltage regulator is a flyback regulator, which uses a transformer to transfer energy from input to output. The output voltage $V_{OUT}$ is defined by $V_{OUT}=V_{IN} \times N \times DC/(1-DC)$, where N is the ratio of the number of turns in the secondary winding of the transformer to the number of turns in the primary winding of the transformer. Unlike the buck regulator, which provides current to the load when the switch is closed, the flyback regulator provides current to the load when the switch is open. When the switch is closed, the switch current flows through the primary inductive winding of the transformer, causing energy to be stored in the winding. When the switch opens, the current supplied to the primary winding ceases, and the energy stored in the primary winding is transferred to the secondary winding of the transformer, which delivers a current to the load. The current in the secondary winding is equal to the reciprocal of turns ratio N times the current in the primary winding prior to the opening of the switch. Although the maximum output current in a conventional flyback regulator can exceed the switch current, the maximum output current nevertheless is limited because current is provided to the load only during the off cycle of the switch.

In view of the foregoing, it would be desirable to be able to provide a switching voltage regulator capable of providing a stepped-down voltage at a power level exceeding that of a conventional buck or flyback converter.

It would also be desirable to be able to provide a switching voltage regulator capable of providing a stepped-down voltage at an output current level exceeding the maximum current rating of the switch employed in the circuit, and at an output current level exceeding that of a conventional buck or flyback regulator.

SUMMARY OF THE INVENTION

It is therefore an object of the present invention to provide a novel circuit for a switching voltage regulator capable of providing a stepped-down voltage at an output current and power level exceeding that of a conventional buck or flyback regulators.

It is a further object of the present invention to provide a novel circuit for a switching voltage regulator capable of providing a stepped-down voltage at an output current level exceeding the maximum current rating of the switch employed in the circuit.

These and other objects of the present invention are accomplished by a switching voltage regulator circuit in which the switch current flowing during the closed condition of the switch is used to provide current simultaneously to the load and to an energy storage device for subsequent transfer to the load during the open condition of the switch, such that a substantially continuous current is provided to the load.

BRIEF DESCRIPTION OF THE DRAWINGS

The above and other objects and advantages of the present invention will be apparent upon consideration of the following detailed description, taken in conjunction with the accompanying drawings, in which like reference characters are provided to like parts throughout, and in which.

DETAILED DESCRIPTION OF THE INVENTION

Figure 1A:
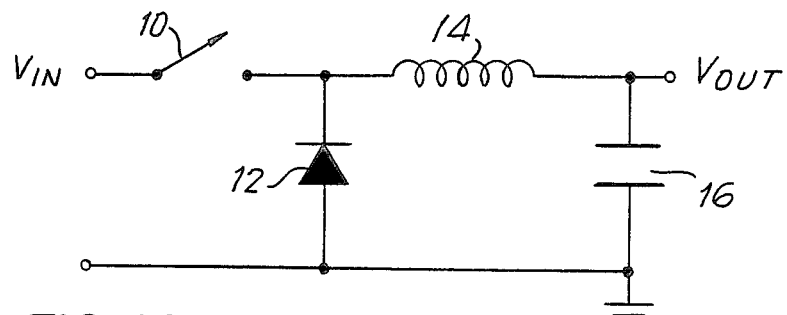
FIG. 1A is a simplified schematic diagram of a conventional buck regulator.

FIGS. IA and IB are simplified drawings of, respectively, conventional buck and flyback switching voltage regulators. Referring first to the buck regulator shown in FIG. 1A, switch 10 is connected to one end of inductive element 14, the other end of which is connected to output terminal $V_{OUT}$. Also connected to inductor 14 and switch 10 is the cathode of steering diode 12, the anode of which is connected to ground. In addition, storage capacitor 16 is connected between $V_{OUT}$ and ground.

The buck regulator of FIG. 1A operates in a well known manner by delivering current to inductor 14 each time switch 10 is closed. When switch 10 is closed, a current passes through inductor 14. That current, which increases linearly over time because of the inductor, is supplied to the load. Current thus flows through a loop including switch 10, inductor 14 and the load. While switch 10 is closed, current does not pass through diode 12 because diode 12 is back-biased. When switch 10 is opened, current ceases to pass through switch 10. Instead, inductor 14 discharges energy which had been stored in it while switch 10 was closed in the form of a current to the load. With switch 10 open, diode 12 is forward biased, and a current flows through a loop defined by inductor 14, the load connected to $V_{OUT}$, and diode 12.

From the foregoing discussion, it will be readily apparent that, in a buck regulator, current is provided to the load from the input supply only while switch 10 is closed. It will also be readily apparent that because of the series connection of switch 10 and inductor 14, the output current delivered to a load equals the current through switch 10, and cannot exceed the maximum current handling capability of switch 10.

Figure 1B:
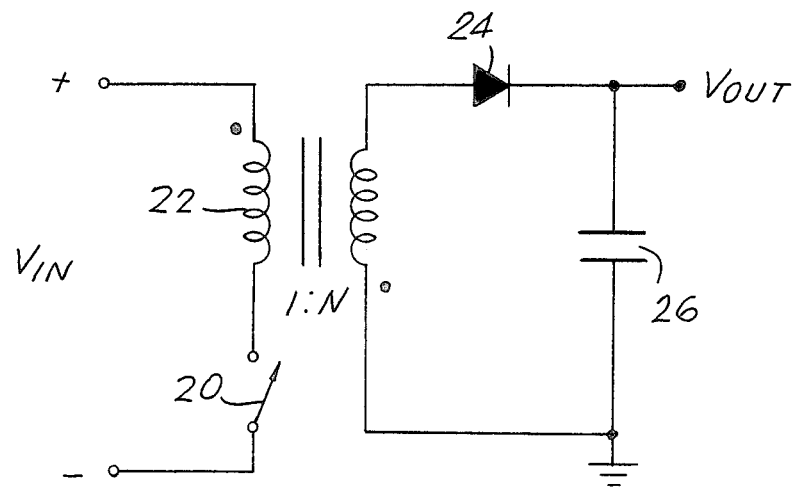
FIG 1B is a simplified schematic diagram of a conventional flyback regulator.

Referring now to the conventional flyback regulator of FIG. 1B, one end of switch 20 is connected to one end of the primary winding of transformer 22. Transformer 22 has a primary to secondary turns ratio of 1:N, with the primary and secondary windings oppositely polarized as indicated by the dots. The other ends of switch 20 and the primary winding of transformer 22 are connected to the input supply. The secondary winding of transformer 22 is connected to a circuit comprised of diode 24 connected in series with capacitor 26. The output of the flyback regulator, $V_{OUT}$, is taken from the node between diode 24 and capacitor 26.

The flyback regulator of FIG. 1B operates in a well known manner by delivering current to a load connected to $V_{OUT}$ when switch 20 is open. When switch 20 is closed, current flows through the inductive primary winding of transformer 22, and the winding stores energy. Current is not induced in the secondary winding at this time because diode 24 is back-biased. When switch 20 is opened, however, energy is transferred from the primary winding to the secondary winding of transformer 22, diode 24 is forward biased, and current flows through a loop defined by diode 24, the load, and secondary winding of transformer 22. Because of the turns ratio, N, of transformer 22, the maximum current provided to $V_{OUT}$ can exceed the current through switch 20. That maximum current is determined by the formula:

$$I_{OUT} = \frac{I_P \times V_{IN}}{(N \times V_{IN}) + V_{OUT}},$$

where $I_p$ is the peak switch current, $V_{IN}$ is the input voltage, $V_{OUT}$ is the output voltage, and N is the transformer primary to secondary turns ratio. Output current in the flyback regulator is limited, however, because current is provided to the load only while switch 20 is open.

In contrast to conventional buck and fly-back regulators, which provide current to the load only when the switch is either opened or closed, the regulator of the present invention provides current to the load both when the switch is opened and when it is closed, thus increasing the maximum current which may be provided to the load.

Figure 2A:
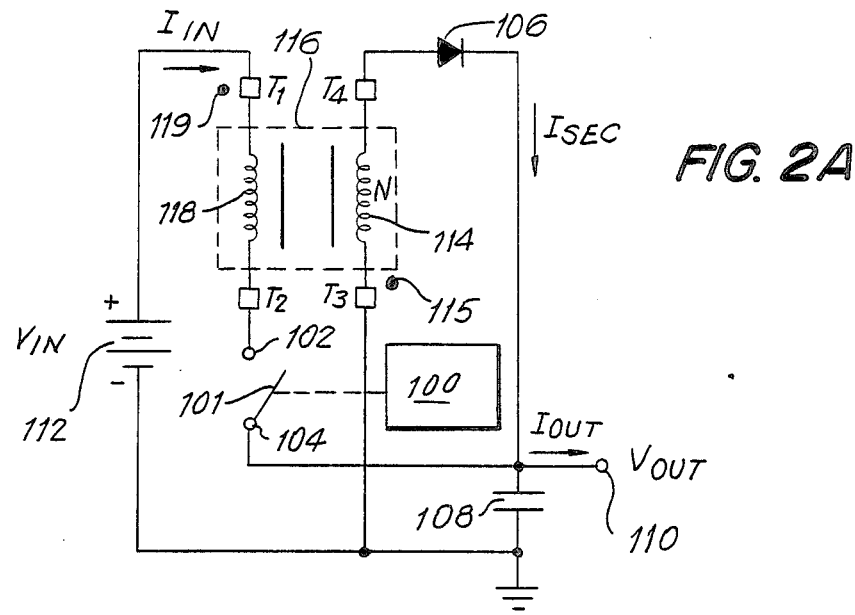
FIG. 2A is a schematic diagram of a first embodiment of the switching regulator circuit of the present invention which converts a positive input voltage to a lower positive regulated output voltage.

Referring to FIG. 2A, which shows a schematic diagram of an embodiment of the invention for providing a positive output voltage, switch 101 represents the switch of a switching voltage regulator circuit having switch terminals 102 and 104. Switch 101 is turned on and off by switching circuitry 100, shown operatively connected to switch 101 by a dashed line. Switching circuitry 100 and switch 101 may be substantially any discrete or integrated circuit switching regulator which allows access to the terminals of the power switching device within the regulator. Preferably, switch 101 and switching circuitry 100 may be implemented using an LT1070 integrated circuit switching regulator manufactured by Linear Technology Corporation of Milpitas, California.

Terminal 104 of switch 101 is connected to the cathode of diode 106, to one end of capacitor 108, and to output terminal 110 of the circuit. The other end of capacitor 108 is connected to ground, to the negative side of voltage source 112 and to terminal T3 of secondary winding 114 of transformer 116. Terminal T4 of secondary winding 114 is connected to the anode of diode 106. Transformer 116 is a conventional transformer having a turn ratio of primary winding 118 to secondary winding 114 equal to 1/N. Dots 115 and 119 are provided to indicate that the polarity of windings 114 and 118 are opposite. Terminal T2 of the primary winding 118 is connected to terminal 102 of switch 101. Terminal T1 of primary winding 118 is connected to the positive side of voltage source 112. Voltage source 112 has a voltage value equal to $V_{IN}$. Switch 101 has a maximum switch current rating of $I_{MAX}$.

When switch 101 is closed, primary winding 118 of transformer 116 acts as an inductor, storing energy as current $I_{IN}$ rises. At this time, the polarity of secondary winding 114 causes diode 106 to be reverse biased to prevent current flow through the secondary winding of transformer 116. Current, flowing through a first loop including primary winding 118, switch 101, capacitor 108 and the load connected at $V_{OUT}$, is delivered to the $V_{OUT}$ terminal while the switch is closed equal to switch current.

When switch 101 is opened, the energy stored in primary winding 118 is transferred to secondary winding 114 and to $V_{OUT}$ as a consequence of a current $I_{SEC}$ flowing in a second loop including secondary winding 114, diode 106, capacitor 108, and the load. Secondary winding 114 generates the necessary voltage to forward bias diode 106. Current $I_{SEC}$ through secondary winding 114 is equal to $I_P/N$, where $I_p$ is the current which flowed through primary winding 118 and switch 101 while the switch was closed, which is 1/N times greater than the current supplied to output node 120 the instant before switch 101 was opened.

Preferably, a value of 0.25 is given to turns ratio N, although other values of N may be used. If the maximum current rating of switch 101 is 5A, current $I_{OUT}$ delivered to a load can be as high as 5A during the closed condition of switch 101, and as high as 20A during the open condition of switch 101. Total available output current $I_{OUT}$ depends on the switch duty cycle, which in turn is determined by the input voltage $V_{IN}$ and the output voltage $V_{OUT}$, and by the value of turns ratio N. Neglecting the forward voltage drop across diode 106, the duty cycle (DC) is defined by the equation $DC = V_{OUT}/[V_{OUT} + N(V_{IN} - V_{OUT})]$, and the maximum available output current $I_{OUT}$ is approximately defined as $I_{OUT} = I_{MAX} \times V_{IN}/[V_{OUT} + N(V_{IN} - V_{OUT})]$.

As a consequence of the use of a transformer as shown, the switching regulator configuration of the present invention, unlike conventional buck and flyback configurations, provides current to a load both when the switch is opened and when it is closed. The invention thus provides an increase in maximum output current ($I_{OUT}$) as compared to the maximum output current of a conventional buck regulator ($I_{BUCK}$) equal to : $I_{OUT}/I_{BUCK} = V_{IN}/[V_{OUT} + N(V_{IN} - V_{OUT})]$. For example, in a 15 V to 5 V regulator with a transformer turns ratio N equal to 0.25, $I_{OUT}/I_{BUCK} = 15/[5 + 0.25(15-5)] = 2$, which is a 100% increase in output current using the circuit of the invention as compared to a conventional buck regulator. The increase in output current is obtained at the expense of an increase in the voltage across switch 101 during open conditions of switch 101. For a conventional buck regulator, the maximum switch voltage ($V_S$) is equal to the input voltage $V_{IN}$. For the regulator of the present invention, the maximum switch voltage $V_S$ is defined as $V_S = V_{IN} + V_{OUT}(1-N)/N$.

The present invention likewise supplies more output current than a conventional flyback regulator because current flows to the output both when the switch is open and when it is closed. As compared to a conventional flyback regulator, the increase in maximum output current of the regulator of the invention is as follows:

$$I_{OUT}/I_{FLY} = [NV_{IN} + V_{OUT}]/NV_{IN} + V_{OUT} - N \cdot V_{OUT},$$

where N is the primary to secondary transformer turns ratio, $V_{IN}$ is the supply voltage and $V_{OUT}$ is the output voltage. For example, in a 15 V to 5 V regulator with a transformer turns ratio of 0.25, $I_{OUT}/I_{FLY} = 1.17$, meaning that the maximum output current of the regulator of the invention is 17% greater than that of the flyback regulator.

Figure 2B:
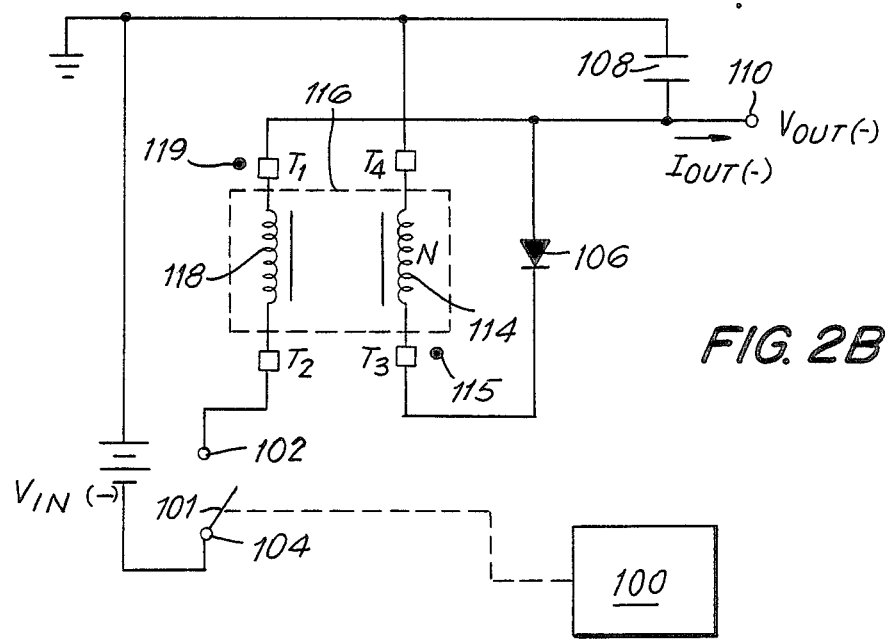
FIG. 2B is a schematic diagram of a second embodiment of the switching regulator circuit of the present invention which converts a negative input voltage to a lower negative output voltage.

Referring now to FIG. 2B, an embodiment of the switching regulator of the present invention is shown which converts a negative input voltage to a less negative output voltage. Switch 101 represents the switch of a switching voltage regulator having switch terminals 102 and 104, switch 101 being controlled on and off by switching circuitry 100 as described with respect to FIG. 2A. Terminal 104 is connected to the negative side of voltage source 112. The positive side of voltage source 112 is connected to ground, to terminal T4 of secondary winding 114 of transformer 116 and to one end of capacitor 108. Terminal T3 of secondary winding 114 is connected to the cathode of diode 106. The other end of capacitor 108 is connected to the output terminal 110 of the circuit, to the anode of diode 106, and to terminal T1 of primary winding 118 of transformer 116. Terminal T2 of primary winding 118 is connected to the switch terminal 102 of switch 101. Transformer 116 is a conventional transformer having a ratio of primary winding 118 to secondary winding 114 equal to 1/N. Dots 115 and 119 are provided to indicate the relative polarity of windings 114 and 118.

The circuit of FIG. 2B operates in the same manner as described above for the operation of the circuit of FIG. 2A, except that the values of input voltage $I_{IN}$, input voltage $V_{IN}$, and output current $I_{OUT}$ are negative.

Figure 3:
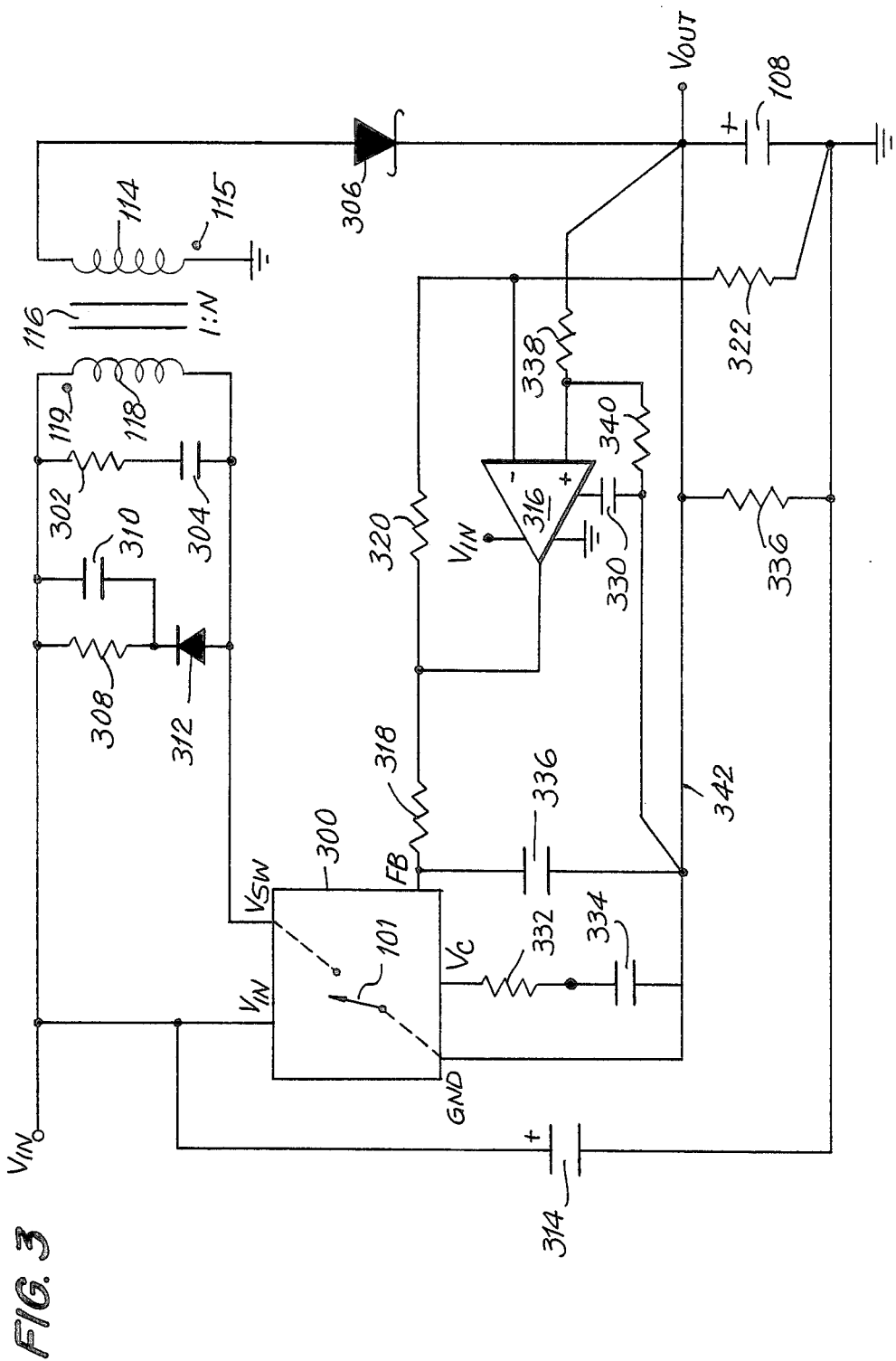
FIG. 3 is a detailed schematic diagram of of the switching regulator of the present invention which converts a positive input voltage to a lower positive output voltage.

Referring now to FIG. 3, a positive output voltage switching regulator of the present invention is shown utilizing an LT1070 integrated circuit switching regulator 300 manufactured by Linear Technology Corporation of Milpitas, Calif. Switch 101, drawn in dashed lines, is internal to integrated circuit 300 connected between pin $V_{SW}$ and pin GND of circuit 300. Pin $V_{IN}$ is the power input, pin FB is the feedback pin, and pin $V_c$ is the compensation pin of integrated circuit 300. Resistor 332 and capacitor 334 connected in series between pin $V_c$ and pin GND serve to frequency compensate integrated circuit 300 to prevent oscillations. Further information and details concerning the LT1070 device, and the functions of its pins, may be found in Application Note 19, dated June 1986, entitled "LT1070 Design Manual", published by Linear Technology Corporation.

Transformer 116 and capacitor 108 are connected to integrated circuit 300 in the manner described with regard to FIG. 2A, above. Diode 306 also is connected in the manner of diode 106 of FIG. 2A, except that diode 306 is a Schottky diode. A Schottky diode is used because such a diode has a forward voltage drop of only about 0.5V at high current levels, as compared to a conventional diode having a forward drop of 1.8V or more at high currents. By decreasing the voltage dropped across the diode, more voltage is available at the output and the overall efficiency of the regulator is increased.

The circuit of FIG. 3 further includes series-connected resistor 302 and capacitor 304 connected across the primary winding of transformer 118. Resistor 302 and capacitor 304 together function as a conventional damper circuit to prevent ringing upon the switching off of switch 101. Also connected across the primary winding of transformer 116 are resistor 308 connected in series with diode 312, and capacitor 310 connected in parallel with resistor 308. Resistor 308, capacitor 310 and diode 312 function as a conventional snubber circuit to prevent integrated circuit 300 from becoming damaged by excessive flyback voltage generated by transformer 116 upon turn off of switch 101. Another capacitor 314, connected between pin $V_{IN}$ of integrated circuit 300 and ground, functions to smooth and filter the unregulated voltage $V_{IN}$.

Also connected to integrated circuit 300 is operational amplifier 316, which preferably is an LM308 differential amplifier such as is commercially available from Linear Technology Corporation or any of a number of other vendors. The output of amplifier 316 is connected to one end of resistor 318, the other end of which is connected to pin FB of integrated circuit 300. Capacitor 336, connected between pin FB and $V_{OUT}$, serves to filter switching spikes from pin FB. Capacitor 330, connected between amplifier 316 and $V_{OUT}$, functions to frequency compensate amplifier 316. The level of the output voltage at pin $V_{OUT}$ is established by resistor 320, connected between the output and negative input of amplifier 316, and resistor 322, connected between the negative input of amplifier 316 and ground.

The purpose of operational amplifier 316 is to generate a feedback signal, required by integrated circuit 300, which floats above the regulated output at pin $V_{OUT}$. Such a floating feedback signal is required because the ground pin, GND, of integrated circuit 300, is tied to $V_{OUT}$, the regulated output, rather than to ground.

Resistor 338, connected between the positive input of amplifier 316 and $V_{OUT}$, and resistor 340, connected between the positive input of amplifier 316 and pin GND of integrated circuit 300, function as a Kelvin sensing network between pin $V_{OUT}$ and pin GND of integrated circuit 300. Resistors 338 and 340 sense any voltage drop across wire 342 which may occur at high currents, thereby to improve load regulation. Such voltage drop may reach as high as several hundred millivolts, depending on the length and gauge of wire 342. If wire 342 is sufficiently short and of sufficient gauge, resistors 338 and 340 may be eliminated. Resistor 336, connected between $V_{OUT}$ and ground, functions to provide a minimum preload on the output of the regulator circuitry to prevent the output voltage from going unregulated high in the event a load were removed from $V_{OUT}$.

The circuit of FIG. 3 operates as described with respect to FIG. 2A to provide a regulated voltage output of 5 volts at 10 amps, for a supply voltage $V_{IN}$ of 28 V, when the following parts values are used:

| | |
|---|---|
| resistor 302: | 470 ohms |
| resistor 308: | 470 ohms |
| resistor 318: | 1K ohms |
| resistor 320: | 1.24K ohms |
| resistor 332: | 680 ohms |
| resistor 338: | 5K ohms |
| resistor 340: | 1.24K ohms |
| resistor 322: | 5K ohms |
| resistor 336: | 100 ohms |
| capacitor 312: | 0.47 µf |
| capacitor 304: | .002 µf |
| capacitor 334: | 0.33 µf |
| capacitor 336: | 0.01 µf |
| capacitor 330: | 200 µf |
| capacitor 108: | 5000 µf |

The maximum output current of 10 amps is twice the rating of the switch internal to the LT1070 integrated circuit 300. Thus, a voltage regulator circuit employing a switching voltage regulator has been disclosed. One skilled in the art will appreciate that the present invention can be practiced by other than the described embodiments, which are presented for purposes of illustration and not of limitation, and the present invention is limited only by the claims which follow.

What is claimed is:

1. A switching voltage regulator circuit for connection to a power supply, the circuit generating at an output terminal an output voltage no greater in magnitude than the power supply voltage, comprising:
   switching means for controlling on and off conduction of an input current from the power supply;
   a diode;
   a capacitor connected to said diode and to the output terminal; and
   energy storage means connected to said diode, said capacitor and said switching means for providing input current to the output terminal and for storing energy when said switching means conducts input current, and for providing to the output terminal from the stored energy a current exceeding the input current when said switching means does not conduct input current, whereby the total current delivered to the output terminal exceeds the input current conducted by said switching means.

2. The switching voltage regulator of claim 1, wherein said energy storage means comprises a transformer having a primary winding and a secondary winding, and wherein said transformer has a primary-to-secondary winding turns ratio of 1:n, where n is less than 1.

3. The switching regulator of claim 2, wherein the primary winding is in series with said switching means and said capacitor in a first loop and the secondary winding is in series with said diode and said capacitor in a second loop.

4. The switching regulator of claim 3, wherein the first and second loops each include a plurality of nodes, at least one of which is in common with the first and second loops and comprises the output terminal.

5. A switching voltage regulator circuit for connection to a power supply, the regulator circuit including an output terminal and a switching device for controlling conduction on and off of an input current from the power supply to generate an output voltage at the output terminal having a magnitude no greater than the magnitude of an input voltage from the power supply, comprising:
   a diode;
   a capacitor; and
   a transformer means having a primary winding and a secondary winding, wherein:
   said transformer has a primary-to-secondary winding turns ratio of 1:n, where n is less than 1; and
   said primary winding, the switching device and said capacitor are connected in series with the power supply in a first loop, and said secondary winding, said diode and said capacitor are connected in series in a second loop, the first and second loops including a plurality of nodes at least one of which is in common with the first and second loops and comprises the output terminal, whereby an output current is provided to the output terminal which exceeds the input current conducted by the switching device.

* * * * *

UNITED STATES PATENT AND TRADEMARK OFFICE
CERTIFICATE OF CORRECTION

PATENT NO. : 4,731,719

DATED : March 15, 1988

INVENTOR(S) : Carl T. Nelson

It is certified that error appears in the above-identified patent and that said Letters Patent is hereby corrected as shown below:

Column 5, line 40, "$NV_{IN} + V_{OUT} - NV_{OUT}$" should be --$[NV_{IN} + V_{OUT} - NV_{OUT}]$--.

Signed and Sealed this

Fourteenth Day of March, 1989

Attest:

DONALD J. QUIGG

Attesting Officer

Commissioner of Patents and Trademarks